United States Patent
Yoneyama et al.

(10) Patent No.: US 12,090,963 B2
(45) Date of Patent: Sep. 17, 2024

(54) VEHICLE HOOK APPARATUS

(71) Applicants: NIHON PLAST CO., LTD., Fujinomiya (JP); HONDA MOTOR CO., LTD., Tokyo (JP)

(72) Inventors: Yojiro Yoneyama, Shizuoka (JP); Shin Matsumoto, Tokyo (JP)

(73) Assignees: NIHON PLAST CO., LTD., Fujinomiya (JP); HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 17/946,078

(22) Filed: Sep. 16, 2022

(65) Prior Publication Data

US 2023/0090891 A1 Mar. 23, 2023

(30) Foreign Application Priority Data

Sep. 21, 2021 (JP) ................................. 2021-153214

(51) Int. Cl.
*B60R 7/10* (2006.01)

(52) U.S. Cl.
CPC ...................................... *B60R 7/10* (2013.01)

(58) Field of Classification Search
CPC ........... B60R 7/10; B60R 7/043; B60R 7/005; B60R 2011/0003; B60R 2011/0015
See application file for complete search history.

(56) References Cited

U.S. PATENT DOCUMENTS

| | | | |
|---|---|---|---|
| 2010/0187393 A1* | 7/2010 | Lee ........................ | F16B 45/008 248/288.11 |
| 2012/0043363 A1* | 2/2012 | Lee ........................... | B60R 7/10 224/313 |
| 2017/0265666 A1* | 9/2017 | Sotome ..................... | B60R 7/10 |
| 2018/0208122 A1* | 7/2018 | Mozurkewich ........... | B60R 7/10 |
| 2020/0130596 A1* | 4/2020 | Dendo .................. | F16B 45/023 |
| 2023/0048639 A1* | 2/2023 | Braun .................... | B60N 3/004 |

FOREIGN PATENT DOCUMENTS

| | | |
|---|---|---|
| JP | 2009-166544 | 7/2009 |
| JP | 2013-107566 | 6/2013 |

* cited by examiner

*Primary Examiner* — Brian D Nash
(74) *Attorney, Agent, or Firm* — Amin, Turocy & Watson, LLP

(57) ABSTRACT

Provided is a vehicle hook apparatus capable of preventing damage to a predetermined component that receives a load applied to a hook member. The vehicle hook apparatus includes a hook member provided to be displaceable between a storage position where the hook member is stored by being tilted to a side of a predetermined component and a use position where the hook member is used by being raised from the side of the predetermined component. The hook member includes a locking portion locking to the predetermined component when a first load is applied in a direction in which the hook member is further raised from the use position, and a weak portion deformed to unlock the locking portion from the predetermined component, when a second load exceeding the first load is applied at the use position.

5 Claims, 4 Drawing Sheets

VEHICLE HOOK APPARATUS

CROSS REFERENCE TO RELATED APPLICATIONS

The disclosure of Japanese Patent Application No. 2021-153214 filed on Sep. 21, 2021 including the specification, drawings and abstract is incorporated herein by reference in its entirety.

TECHNICAL FIELD

The present invention relates to a vehicle hook apparatus.

BACKGROUND ART

In the related art, there is a vehicle hook apparatus having a hook member rotating and projecting when an object is hooked and stored when not in use. For example, the vehicle hook apparatus is used to hook and hang a shopping bag or the like.

For example, a vehicle hook apparatus disclosed in PTL 1 includes a case, a hook member, and a shaft (rotary shaft). The case is fastened to a vehicle body via a mounting bracket. A bezel is disposed in the vehicle body. In the shaft, a bezel, the hook member, and the case are integrated.

A vehicle hook apparatus disclosed in PTL 2 includes a case and a hook member, and the hook member has a shaft portion. The case has a shaft holding portion for holding the shaft portion. The case is fastened to a vehicle body.

CITATION LIST

Patent Literature

PTL 1
 Japanese Patent Application Laid-Open No. 2009-166544
PTL 2
 Japanese Patent Application Laid-Open No. 2013-107566

SUMMARY OF INVENTION

Technical Problem

Incidentally, the invention disclosed in PTL 1 has a problem as follows. When an overload is applied to the hook member, the mounting bracket for receiving the load applied to the hook member may be deformed, and may not return to an original shape in some cases.

In addition, the invention disclosed in PTL 2 has a problem as follows. When the overload is applied to the hook member, the shaft portion for receiving the load applied to the hook member or the shaft holding portion may be damaged in some cases.

An object of the present invention is to provide a vehicle hook apparatus which can prevent damage to a predetermined component for receiving a load applied to a hook member.

Solution to Problem

According to the present invention, in order to achieve the above object, there is provided a vehicle hook apparatus including a hook member provided to be displaceable between a storage position where the hook member is stored by being tilted to a side of a predetermined component and a use position where the hook member is used by being raised from the side of the predetermined component. The hook member includes a locking portion locking to the predetermined component when a first load is applied in a direction in which the hook member is further raised from the use position, and a weak portion deformed to unlock the locking portion from the predetermined component, when a second load exceeding the first load is applied at the use position.

Advantageous Effects of Invention

According to the present invention, there is provided a vehicle hook apparatus capable of preventing damage to a predetermined component that receives a load applied to a hook member.

DESCRIPTION OF EMBODIMENTS

Figure 1:
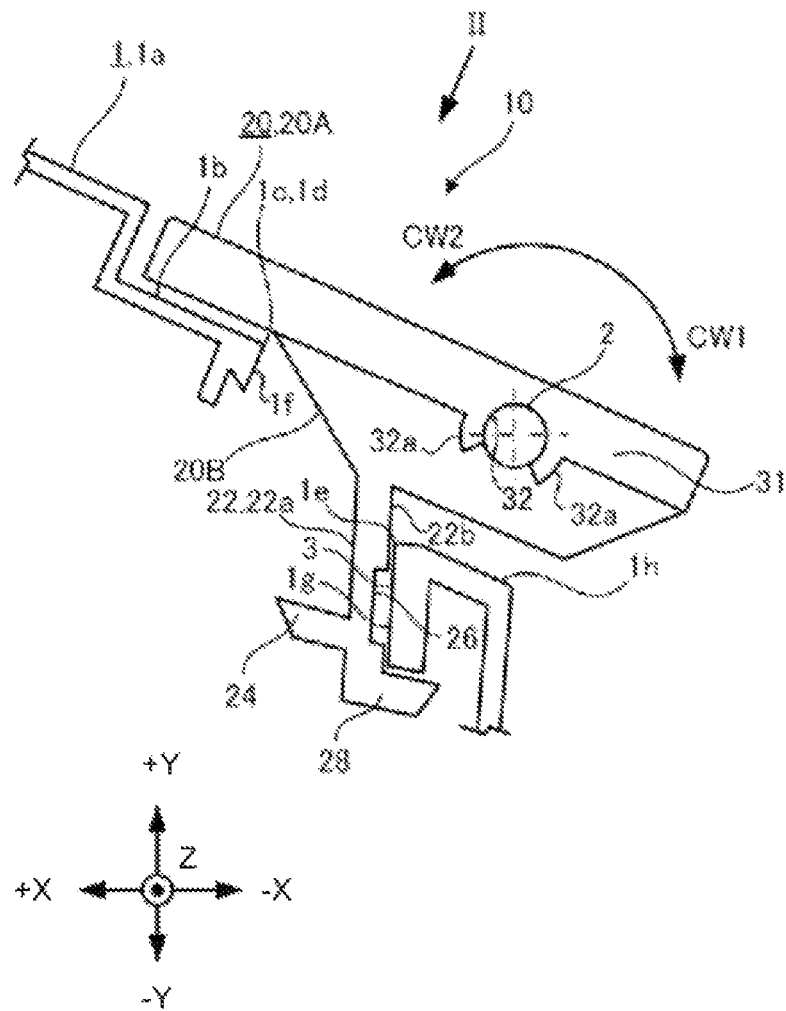
FIG. 1 is a view schematically illustrating a vehicle hook apparatus according to an embodiment of the present invention.

Hereinafter, an embodiment of the present invention will be described with reference to the drawings. FIG. 1 is a view schematically illustrating a vehicle hook apparatus according to an embodiment of the present invention. FIG. 1 illustrates an X-axis, a Y-axis, and a Z-axis. In FIG. 1, a rightward-leftward direction will be referred to as a forward-rearward direction or an X-direction, a leftward direction will be referred to as a forward direction, a front side, or a "+X-direction", and a rightward direction will be referred to as a rearward direction, a rear side, or a "−X-direction". In addition, an upward-downward direction will be referred to as a vehicle height direction, a vehicle interior inward-outward direction or a Y-direction, an upward direction will be referred to as a vehicle interior inner side or a "+Y-direction", and a downward direction will be referred to as a vehicle interior outer side or a "−Y-direction". In addition, a depth direction will be referred to as a vehicle width direction or a Z-direction. In addition, in FIG. 1, a direction in which a hook member 20 (to be described later) is raised will be referred to as a clockwise direction or a "rising direction", and the direction is represented by "CW1". In addition, a direction in which the hook member 20 is tilted will be referred to as a counterclockwise direction or a "falling direction", and the direction is represented by "CW2".

FIG. 1 illustrates a panel member 1 forming an interior material of a vehicle interior. The vehicle hook apparatus 10 according to the present embodiment is mounted on the panel member 1.

The panel member 1 has a surface 1a facing the vehicle interior inner side (+Y-direction), a recess-shaped storage portion 1b formed to be recessed from the surface 1a to the vehicle interior outer side (−Y-direction), and an opening portion 1c. The opening portion 1c is open in a central portion of the storage portion 1b, and causes the vehicle interior inner side and the vehicle interior outer side to communicate with each other. A front side edge 1d of the opening portion 1c has a front side wall 1f extending to the vehicle interior outer side. In addition, a rear side edge 1e of the opening portion 1c has a rear side wall 1g extending to the vehicle interior outer side.

The panel member 1 has a columnar shaft 2. The shaft 2 extends in the vehicle width direction (Z-direction).

The vehicle hook apparatus 10 according to the present embodiment includes the above-described hook member 20. The hook member 20 has a vehicle interior inner side hook 20A disposed on the vehicle interior inner side (+Y-direction) and a vehicle interior outer side hook 20B disposed on the vehicle interior outer side (−Y-direction).

Figure 2:
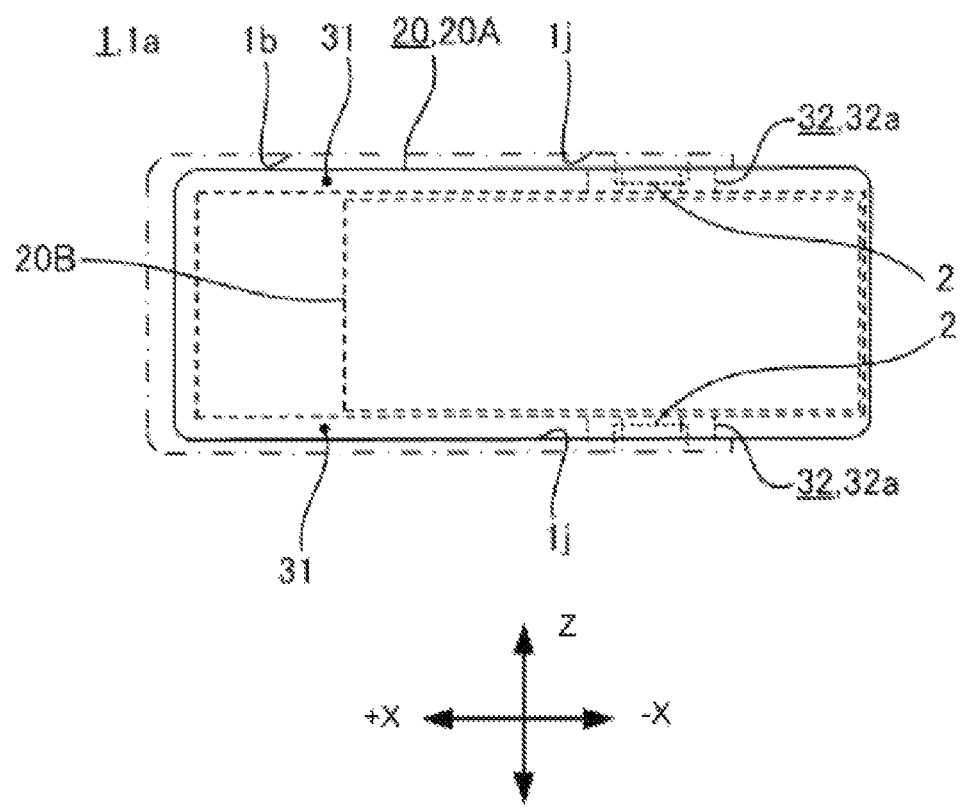
FIG. 2 is a view taken along an arrow II in FIG. 1.

FIG. 2 is a view taken along an arrow II in FIG. 1. As illustrated in FIG. 2, the hook member 20 is stored in a storage portion 1b. The vehicle interior inner side hook 20A and the vehicle interior outer side hook 20B are combined with each other. The vehicle interior inner side hook 20A has a pair of flanges 31 disposed on both sides in the vehicle width direction (Z-direction) and extending in the forward-rearward direction (X-direction). The vehicle interior outer side hook 20B is fitted between the pair of flanges 31. The storage portion 1b has both side walls 1j disposed on both sides in the vehicle width direction (Z-direction) and extending in the forward-rearward direction. The shaft 2 illustrated by a broken line in FIG. 2 is projected toward the pair of flanges 31 from each of both side walls 1j.

As illustrated in FIGS. 1 and 2, the vehicle interior inner side hook 20A has a fitting portion 32. The fitting portion 32 is formed in the flange 31, and is fitted to be rotatable around the shaft 2. The fitting portion 32 has a pair of pinching pieces 32a. The pair of pinching pieces 32a respectively have elasticity, disposed to face each other across the shaft 2, and pinch the shaft 2. When the hook member 20 is assembled to the panel member 1, the pair of pinching pieces 32a are pushed into the shaft 2 side in a direction orthogonal to an axis of the shaft 2 with a predetermined force. As a result, a distance between the pair of pinching pieces 32a is widened to be equal to or larger than a diameter of the shaft 2, and thereafter, the pair of pinching pieces 32a are closed to pinch the shaft 2 so that the fitting portion 32 is fitted to the shaft 2. In this manner, the hook member 20 is easily assembled to the panel member 1. On the other hand, when a force (pulling force) acting so that the distance between the pair of pinching pieces 32a is widened to be equal to or larger than the diameter of the shaft 2 is applied to the fitting portion 32 against an elastic force of the pair of pinching pieces 32a, the fitting portion 32 is separated from the shaft 2. In this manner, the hook member 20 is separated from the panel member 1.

Figure 3:
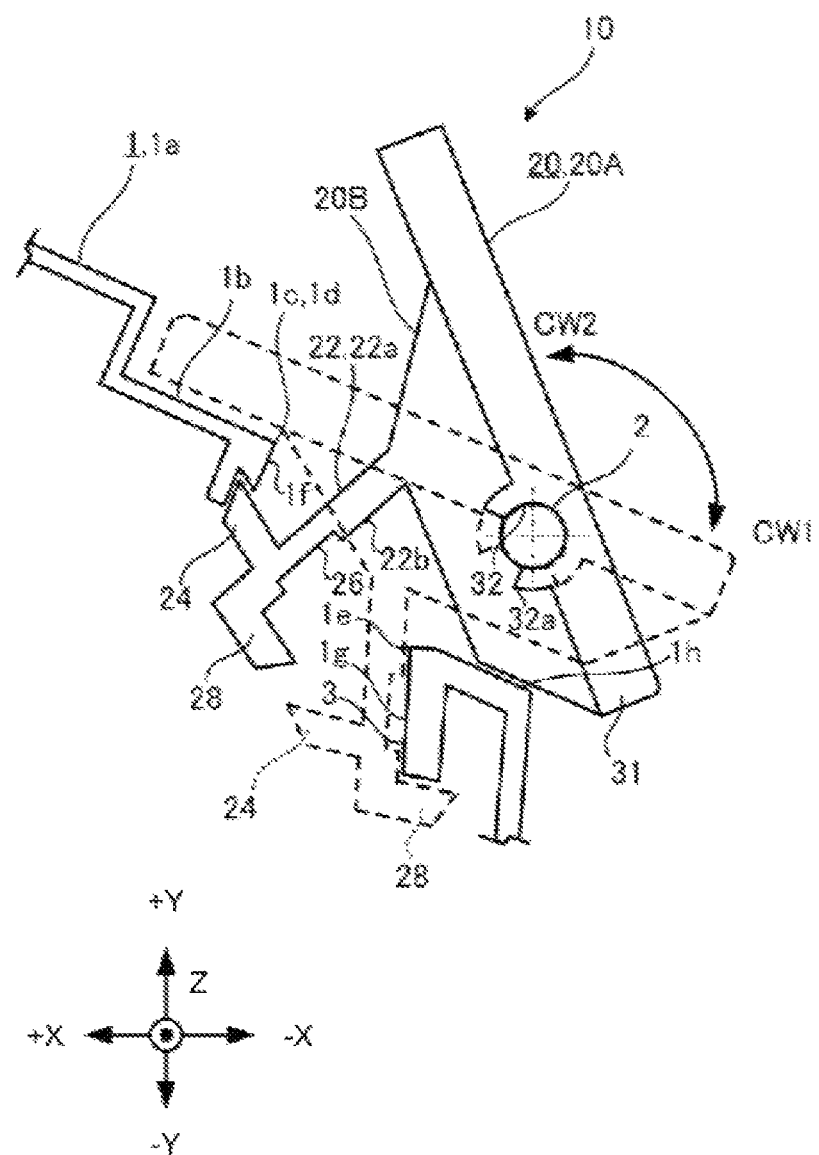
FIG. 3 is a view schematically illustrating the vehicle hook apparatus when a hook member is located at a use position.

FIG. 3 is a view schematically illustrating the vehicle hook apparatus 10 when the hook member 20 is located at a use position. In FIG. 3, the hook member 20 located at a storage position is illustrated by a broken line, and the hook member 20 located at the use position is illustrated by a solid line. The hook member 20 is supported by the shaft 2 to be displaceable between the storage position (position illustrated in FIG. 1) and the use position (position illustrated in FIG. 3). At the storage position, the hook member 20 is tilted in the counterclockwise direction CW2 on a side of the panel member 1, and is stored in the storage portion 1b. In addition, the hook member 20 is raised in the clockwise direction CW1 from a side of the storage portion 1b, and is displaced to the use position. At the use position, an object can be hooked by the hook member 20. In this case, a load applied to the hook member 20 becomes a force for rotating the hook member 20 in the clockwise direction CW1 (rising direction).

The vehicle interior outer side hook 20B has a leg portion 22. The leg portion 22 passes through the opening portion 1c from the vehicle interior inner side (+Y-direction), and extends to the vehicle interior outer side (−Y-direction). Hereinafter, in describing the leg portion 22, the vehicle interior inner side may be referred to as a "base end side", and the vehicle interior outer side may be referred to as a "tip side" in some cases.

A claw portion 24 is disposed in a front side edge 22a of the leg portion 22. The claw portion 24 corresponds to a "locking portion" of the present invention. The claw portion 24 is a protruding portion that protrudes in the forward direction (+X-direction). When a load is applied to the hook member 20 located at the use position, the claw portion 24 locks to the front side edge 1d of the opening portion 1c so that the hook member 20 is not raised from the use position. A groove having the same cross-sectional shape as a V-shaped cross-sectional shape of a tip of the claw portion 24 is formed in the front side edge 1d. Since the claw portion 24 locks to the front side edge 1d, the hook member 20 can be prevented from rotating in the clockwise direction CW1 (rising direction). Therefore, an allowable load can be applied to the hook member 20. The allowable load corresponds to a "first load" of the present invention.

Incidentally, when an excessive load is applied to the claw portion 24 or the front side edge 1d by applying a load exceeding the allowable load to the hook member 20, there is a possibility that the claw portion 24 or the front side edge 1d may be damaged.

Therefore, in the present embodiment, a weak portion 26 is provided in the vehicle interior outer side hook 20B. When the overload (corresponding to a "second load" of the present invention) is applied to the hook member 20, the weak portion 26 is deformed to unlock the claw portion 24 from the front side edge 1d. Specifically, the weak portion 26 is disposed on the vehicle interior inner side (base end side) from a position where the claw portion 24 is disposed in the leg portion 22. Since the weak portion 26 is recessed in a rear side edge 22b of the leg portion 22, the weak portion 26 is thinner than a peripheral portion of the weak portion 26. In other words, each of a base end side and a tip side of the weak portion 26 in the leg portion 22 is thicker than the weak portion 26.

Incidentally, when the hook member 20 is located at the storage position illustrated in FIG. 1, for example, due to an erroneous operation such as lifting a rear end portion of the hook member 20 in the upward direction in FIG. 1, a load (corresponding to a "third load" of the present invention) in the counterclockwise direction CW2 (falling direction) may be applied the hook member 20 from the storage position. In this case, when nothing prevents displacement of the hook member 20 in the counterclockwise direction CW2, the shaft 2 is separated from between the pair of pinching pieces 32a, thereby causing a possibility that the hook member 20 may fall from the panel member 1.

Therefore, in the present embodiment, a contact portion 28 is provided in the vehicle interior outer side hook 20B. The contact portion 28 corresponds to a "falling prevention portion" of the present invention. When a load is applied to the hook member 20 in the counterclockwise direction CW2 (falling direction) from the storage position, the contact portion 28 comes into contact with a tip portion of the rear side wall 1g of the opening portion 1c to prevent the displacement of the hook member 20 in the counterclockwise direction CW2. The contact portion 28 is a protruding portion disposed in the rear side edge 22b of the leg portion 22 and protruding in the rearward direction (−X-direction)

from the rear side edge 22b. Since the contact portion 28 comes into contact with the tip portion of the rear side wall 1g, the hook member 20 can be prevented from falling from the panel member 1.

Each of the contact portion 28 and the weak portion 26 is formed in the same member (for example, the leg portion 22). Specifically, the contact portion 28 is disposed on the vehicle interior outer side (tip side) from a position where the weak portion 26 is disposed in the leg portion 22. In other words, the weak portion 26 is disposed on the vehicle interior inner side (base end side) from the contact portion 28. A movable range in a rotation direction of the hook member 20 is a range from a position where the claw portion 24 comes into contact with the front side edge 1d to a position where the rear side edge 22b comes into contact with the rear side wall 1g. Therefore, as the number of members passing through the opening portion 1c increases, the movable range is accordingly narrowed. In the present embodiment, each of the contact portion 28 and the weak portion 26 is formed in the leg portion 22 which is the same member. Therefore, the movable range of the hook member 20 can be widened, compared to a case where each of the contact portion 28 and the weak portion 26 is formed in a different member.

In addition, as illustrated in FIG. 1, the weak portion 26 is disposed on the vehicle interior inner side (base end side) from the contact portion 28. Therefore, when a load in the falling direction is applied to the hook member located at the storage position, the weak portion 26 is deformed, thereby causing a possibility that the contact portion 28 may be separated from the tip portion of the rear side wall 1g of the opening portion 1c.

Therefore, in the present embodiment, when a load in the falling direction is applied to the hook member located at the storage position, the holding portion 3 for holding the weak portion 26 not to be deformed is disposed. Specifically, the holding portion 3 is the rear side wall 1g of the opening portion 1c. The rear side wall 1g serving as the holding portion 3 comes into contact with each of the base end side and the tip side of the weak portion 26 in the leg portion 22, which is thicker than the weak portion 26, and supports the base end side and the tip side to hold the weak portion 26. In this manner, the weak portion 26 can be prevented from being deformed. As a result, contact of the contact portion 28 can be prevented from being separated from the tip portion of the rear side wall 1g of the opening portion 1c.

Figure 4:
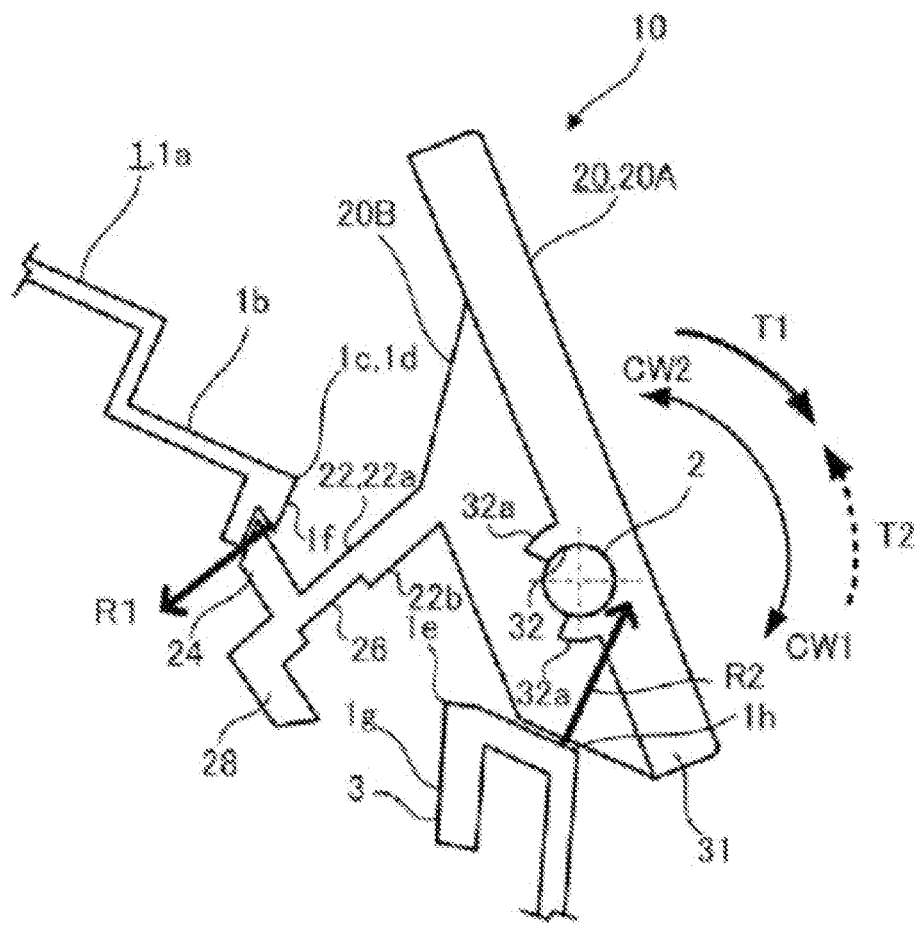
FIG. 4 is a view illustrating an action of a load applied to the hook member.
Figure 4:
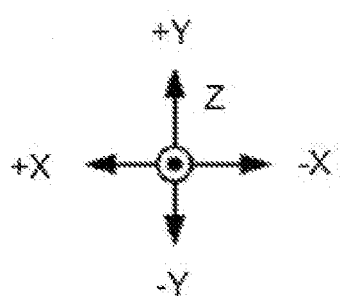

Next, an action of a load applied to the hook member 20 will be described with reference to FIG. 4. As illustrated in FIG. 4, due to the load applied to the hook member 20 located at the use position, a torque T1 in the clockwise direction CW1 is generated to rotate the hook member 20 in the rising direction. In addition, with respect to the load applied to the hook member 20, a reaction force R1 is generated in the claw portion 24 which locks to the front side edge 1d of the opening portion 1c, and in addition, a reaction force R2 is generated in a portion which comes into contact with a rear end portion 1h of the storage portion 1b. The torque T1 in the clockwise direction CW1 which is generated by the load and a torque T2 in the counterclockwise direction CW2 which is generated by the reaction forces R1 and R2 are balanced. In this manner, the hook member 20 is held at the use position. In this case, a load acting so that the distance between the pair of pinching pieces 32a is widened to be equal to or larger than the diameter of the shaft 2 is not applied to the hook member 20.

On the other hand, when the overload is applied to the hook member 20 and the weak portion 26 is deformed to unlock the claw portion 24 from the front side edge 1d, a torque in the clockwise direction CW1 is generated with respect to the hook member 20 while the rear end portion 1h of the storage portion 1b is used as a fulcrum. In this manner, a force acting so that the distance between the pair of pinching pieces 32a is widened to be equal to or larger than the diameter of the shaft 2 is applied to the fitting portion 32. As a result, the fitting portion 32 is separated from the shaft 2. Therefore, the hook member 20 itself is separated from the panel member 1. For example, deformation of the shaft 2 or damage to the shaft 2 can be prevented.

The vehicle hook apparatus 10 according to the present embodiment includes the hook member 20 provided to be displaceable between the storage position where the hook member 20 is stored by being tilted to the side of the panel member 1 and the use position where the hook member 20 is used by being raised from the side of the panel member 1. The hook member 20 includes the claw portion 24 locking to the panel member 1 when the first load is applied in the direction in which the hook member 20 is further raised from the use position, and the weak portion 26 deformed to unlock the claw portion 24 from the panel member 1, when the second load exceeding the first load is applied at the use position.

According to the above-described configuration, when the overload is applied to the hook member 20, the excessive load is not applied to the front side edge 1d. Therefore, for example, damage to the claw portion 24 or the panel member 1 can be prevented.

In addition, in the vehicle hook apparatus 10 according to the present embodiment, the weak portion 26 is thinner than the peripheral portion of the weak portion 26. In this manner, the weak portion 26 can be formed with a simple configuration.

In addition, in the vehicle hook apparatus 10 according to the present embodiment, the hook member 20 has the contact portion 28 that comes into contact with the tip portion of the rear side wall 1g of the opening portion 1c of the panel member 1 to prevent the hook member 20 from falling from the panel member 1, when the load in the falling direction is input from the storage position. In this manner, the hook member 20 can be prevented from being displaced in the falling direction. Therefore, an erroneous operation can be prevented.

In addition, in the vehicle hook apparatus 10 according to the present embodiment, the weak portion 26 is held by the rear side wall 1g not to be deformed, when the load in the falling direction is input to the hook member 20 located at the storage position. In this manner, when the load in the falling direction is input from the storage position, the weak portion 26 is held not to be deformed. Therefore, the hook member 20 can maintain a state of the contact portion 28 that comes into contact with the tip portion of the rear side wall 1g. As a result, the hook member 20 can be prevented from being displaced in the falling direction. Therefore, an erroneous operation can be prevented.

In addition, in the vehicle hook apparatus 10 according to the present embodiment, each of the weak portion 26 and the contact portion 28 is formed in the leg portion 22 which is the same member. In this manner, a movable range of the hook member 20 can be widened, compared to a case where each of the weak portion 26 and the contact portion 28 is formed in a different member. In addition, the hook member 20 has the fitting portion 32, and the fitting portion 32 has the pair of pinching pieces 32a. When the hook member 20 is assembled to the panel member 1, the fitting portion 32 can be fitted to the shaft 2 by pushing the pair of pinching pieces 32a into the shaft 2 side with a predetermined force in a direction orthogonal to an axis of the shaft 2. According to the above-described configuration, assembling workability of the vehicle hook apparatus 10 can be improved. In addition, even when the hook member 20 is separated from the shaft 2 due to the applied overload, the hook member 20 can be easily assembled to the panel member 1.

In addition, in the vehicle hook apparatus 10 according to the present embodiment, the claw portion 24 and the contact portion 28 are provided on side opposite to each other. In this manner, in accordance with the movement of the hook member 20, the hook member 20 can be effectively fixed at the use position, and the hook member 20 can be effectively prevented from falling at the storage position.

In the present embodiment, as a locking target of the claw portion 24, the front side edge 1d of the opening portion 1c of the panel member 1 has been described as an example. However, the present invention is not limited thereto, and the locking target may be any desired component that can receive the load applied to the hook member 20.

In addition, in the present embodiment, the hook member 20 configured to include a plurality of components such as the vehicle interior inner side hook 20A and the vehicle interior outer side hook 20B has been described as an example. However, the present invention is not limited thereto, and for example, the hook member 20 may be a single component.

In addition, in the present embodiment, a case where the panel member 1 has the shaft 2 and the hook member 20 is supported to be rotatable around the shaft 2 has been described as an example. However, the present invention is not limited thereto, and for example, a case may be attached to the panel member 1, the case may have the shaft 2, and the hook member 20 may be supported to be rotatable around the shaft 2.

Alternatively, the above-described embodiments are merely specific examples for implementing the present invention, and the technical scope of the present invention should not be construed in a limited manner by the above-described embodiments. That is, the present invention can be implemented in various forms without departing from the concept or the main features of the present invention.

INDUSTRIAL APPLICABILITY

The present invention is suitably used for a vehicle including a vehicle hook apparatus required to prevent damage to a predetermined component that receives a load applied to a hook member.

REFERENCE SIGNS LIST

1 Panel member
1a Surface
1b Storage portion
1c Opening portion
1d Front side edge
1e Rear side edge
1f Front side wall
1g Rear side wall
1h Rear end portion
1j Both side walls
2 Shaft
3 Holding portion
10 Vehicle hook apparatus
20 Hook member
20A Vehicle interior inner side hook
20B Vehicle interior outer side hook
22 Leg portion
22a Front side edge
22b Rear side edge
24 Claw portion (locking portion)
26 Weak portion
28 Contact portion (falling prevention portion)
31 Flange
32 Fitting portion

What is claimed is:

1. A vehicle hook apparatus comprising:
a hook member provided to be displaceable between a storage position where the hook member is stored by being tilted to a side of a predetermined component and a use position where the hook member is used by being raised from the side of the predetermined component,
wherein the hook member includes
a locking portion locking to the predetermined component when a first load is applied in a direction in which the hook member is further raised from the use position,
a weak portion deformed to unlock the locking portion from the predetermined component, when a second load exceeding the first load is applied at the use position, and
a falling prevention portion that comes into contact with the predetermined component to prevent the hook member from falling from the predetermined component, when a third load is applied in a direction in which the hook member is further tilted from the storage position.

2. The vehicle hook apparatus according to claim 1, wherein the weak portion is formed to be thinner than a peripheral portion of the weak portion.

3. The vehicle hook apparatus according to claim 1, wherein the weak portion is held by the predetermined component not to be deformed, when the third load is applied to the hook member.

4. The vehicle hook apparatus according to claim 1, wherein each of the weak portion and the falling prevention portion is formed in the same member.

5. The vehicle hook apparatus according to claim 1, wherein the locking portion and the falling prevention portion are formed on sides opposite to each other in the same member.

* * * * *